(12) United States Patent
Kikitsu et al.

(10) Patent No.: US 7,625,645 B2
(45) Date of Patent: Dec. 1, 2009

(54) PATTERNED MAGNETIC RECORDING MEDIA, STAMPER FOR MANUFACTURE OF PATTERNED MAGNETIC RECORDING MEDIA, METHOD OF MANUFACTURING PATTERNED MAGNETIC RECORDING MEDIA, AND MAGNETIC RECORDING/REPRODUCTION APPARATUS

(75) Inventors: Akira Kikitsu, Yokohama (JP); Yoshiyuki Kamata, Tokyo (JP); Takayuki Yamamoto, Ome (JP); Hiroyuki Hyodo, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 502 days.

(21) Appl. No.: 11/341,569

(22) Filed: Jan. 30, 2006

(65) Prior Publication Data
US 2006/0172153 A1 Aug. 3, 2006

(30) Foreign Application Priority Data
Jan. 31, 2005 (JP) .............................. 2005-024160

(51) Int. Cl.
*G11B 5/66* (2006.01)
(52) U.S. Cl. ..................................... 428/834
(58) Field of Classification Search ........... 428/834
See application file for complete search history.

(56) References Cited

U.S. PATENT DOCUMENTS

| | | | |
|---|---|---|---|
| 5,497,085 A | 3/1996 | Tian et al. | |
| 6,104,578 A | 8/2000 | Kitazaki et al. | |
| 6,187,413 B1 | 2/2001 | Kuo et al. | |
| 7,050,248 B1 | 5/2006 | Wang | |
| 7,385,785 B2 * | 6/2008 | Hattori et al. | 360/135 |
| 2002/0150794 A1 | 10/2002 | Hamada et al. | |
| 2004/0174636 A1 | 9/2004 | Suzuki et al. | |
| 2005/0003106 A1 | 1/2005 | Isozaki | |
| 2005/0013047 A1 | 1/2005 | Takai et al. | |
| 2005/0045583 A1 | 3/2005 | Fujita et al. | |
| 2008/0193801 A1 * | 8/2008 | Haneda et al. | 428/846.9 |

FOREIGN PATENT DOCUMENTS

| | | |
|---|---|---|
| EP | 1 434 211 A1 | 6/2004 |
| JP | 05-151738 | 6/1993 |
| JP | 08-124340 | 5/1996 |
| JP | 09-167305 | 6/1997 |
| JP | 2000-285538 | 10/2000 |
| JP | 2004-326831 | 11/2004 |

OTHER PUBLICATIONS

Australian Search Report dated Oct. 18, 2006 for Singapore Appln. No. 200600504-5.
Japanese Office Action dated Jul. 21, 2009 for Appln. No. 2005-024160.

* cited by examiner

*Primary Examiner*—Holly Rickman
(74) *Attorney, Agent, or Firm*—Pillsbury Winthrop Shaw Pittman, LLP (57) ABSTRACT

According to one embodiment, a patterned magnetic recording media has a magnetic recording layer and a protective layer formed on a substrate, in which the magnetic recording layer including a magnetic material patterned in tracks and a nonmagnetic material filled in between the tracks in a data area, and has a recessed portion formed in an area within 1 mm from an outer media end and extending to the media end. The recessed portion being formed 1 to 50 nm deeper than the data area.

6 Claims, 6 Drawing Sheets

PATTERNED MAGNETIC RECORDING MEDIA, STAMPER FOR MANUFACTURE OF PATTERNED MAGNETIC RECORDING MEDIA, METHOD OF MANUFACTURING PATTERNED MAGNETIC RECORDING MEDIA, AND MAGNETIC RECORDING/REPRODUCTION APPARATUS

CROSS-REFERENCE TO RELATED APPLICATIONS

This application is based upon and claims the benefit of priority from prior Japanese Patent Application No. 2005-024160, filed Jan. 31, 2005, the entire contents of which are incorporated herein by reference.

BACKGROUND

1. Field

One embodiment of the present invention relates to a patterned magnetic recording media, a stamper for manufacture of the patterned magnetic recording media, a method of manufacturing the patterned magnetic recording media, and a magnetic recording/reproduction apparatus.

2. Description of the Related Art

Recently, a patterned magnetic recording media (patterned media), in which magnetic layer is patterned into forms of data tracks, servo signals or data bits, has been studied in expectation of a high-density magnetic recording media.

During the process of fabricating the patterned magnetic recording media, where a thin film material is etched, dust is often generated on the surface. Moreover, in some cases, surface roughness is enhanced. A magnetic recording media with dust and/or large surface roughness is no good for flying characteristics of the read/write head.

In a conventional magnetic recording media, a contact start stop (CSS) technique, in which a landing zone having a protruded texture pattern is formed on an inner portion of the disk substrate is known. This technique is used to improve the flying characteristics of the magnetic head (see, for example, Jpn. Pat. Appln. KOKAI Publication No. 8-124340 and Jpn. Pat. Appln. KOKAI Publication No. 9-167305). However, it is not appropriate to apply such a technique to the patterned magnetic recording media.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not limited the scope of the invention.

DETAILED DESCRIPTION

Various embodiments according to the invention will be described hereinafter with reference to the accompanying drawings. In general, according to one embodiment of the present invention, there is provided a patterned magnetic recording media, comprising: a magnetic recording layer and a protective layer formed on a substrate, the magnetic recording layer including a magnetic material patterned in a form of data tracks and a nonmagnetic material filled in between the tracks; and a recessed portion formed in an area within 1 mm from an outer end. The recessed portion extends to the media end and is 1 to 50 nm deeper than the surface of the data area. According to another embodiment of the present invention, there is provided a stamper used for patterning the above patterned magnetic recording media, comprising: a pattern corresponding to the recessed portion of the media in an area within 1 mm from a position corresponding to the patterned media end.

A manufacturing process of a patterned magnetic recording media usually includes etching process to form data patterns, resulting in an accumulation of dust and a residual of a mask material on an outer portion of the disk substrate. This is because an etching mask is often formed by coating a liquid material such as a resist. In a cleaning process, dust tends to accumulate at the edge portion of a substrate together with a cleaning liquid, and this also results in an accumulation of dust on an outer portion of the disk substrate. Therefore, when the outer end portion of the substrate is as high as the surface of the data area, dust is attached to the magnetic head during loading and causes a head crash. Precise investigations by the present inventors have revealed that the dust which causes the head crash is localized in an area within 1 mm from the outer end of a disk substrate. Then, it has found out that provision of a recessed portion in that portion can prevent the head crash effectively.

An embodiment of the present invention will hereinafter be described with reference to the drawings.

Figure 1:
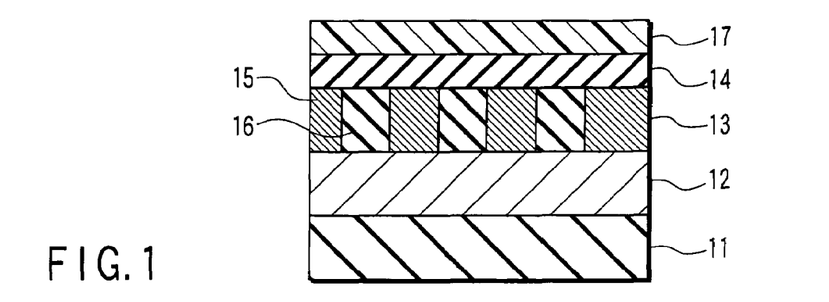
FIG. 1 is a schematic sectional view of a patterned magnetic recording media according to an embodiment of the present invention.

FIG. 1 shows a schematic sectional view of a patterned magnetic recording media according to an embodiment of the present invention. This patterned magnetic recording media consists of; a substrate 11, a soft magnetic underlayer 12, a magnetic recording layer 13 including a patterned magnetic material 15 and a nonmagnetic material 16 filled in between the patterns of the magnetic material 15, a protective layer 14 and a lubricant 17.

Figure 2:
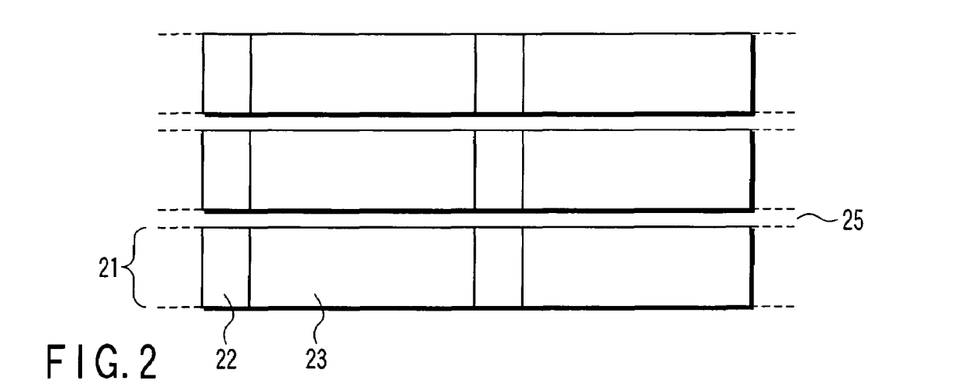
FIG. 2 is a schematic plan view of a discrete track media, which is a type of a patterned magnetic recording media, according to the embodiment of the present invention.

FIG. 2 shows a schematic plan view of a discrete track media, which is a type of a patterned magnetic recording media, according to an embodiment of the present invention. Recording tracks 21 and nonmagnetic material 25, which separates the recording tracks 21, are alternately formed. The nonmagnetic portion corresponds to a guard band in a conventional media. The recording track 21 divides into a servo zone 22, which stores servo signals and the like, and a user area 23 storing user data. In FIG. 2, lines and dotted lines are drawn at the tracks for a better understanding. A configuration shown in FIG. 2 is similar to that used in a conventional magnetic recording media, but is different from in that the nonmagnetic material is included in the servo zones and between the tracks.

Figure 3:
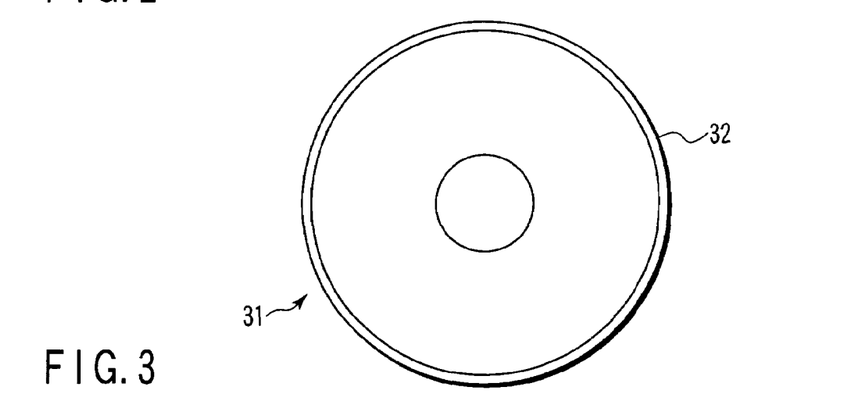
FIG. 3 is a schematic plan view of a patterned magnetic recording media having a recessed portion according to an embodiment of the present invention.

FIG. 3 shows a schematic plan view of a patterned magnetic recording media having a recessed portion according to an embodiment of the present invention. In an area within 1 mm from the outer end of the media 31, a recessed portion 32 is formed with extending to the media end. This drawing shows an example of a recessed portion 32 formed in a ring shape covering all over a circumference of the media.

Figure 4:
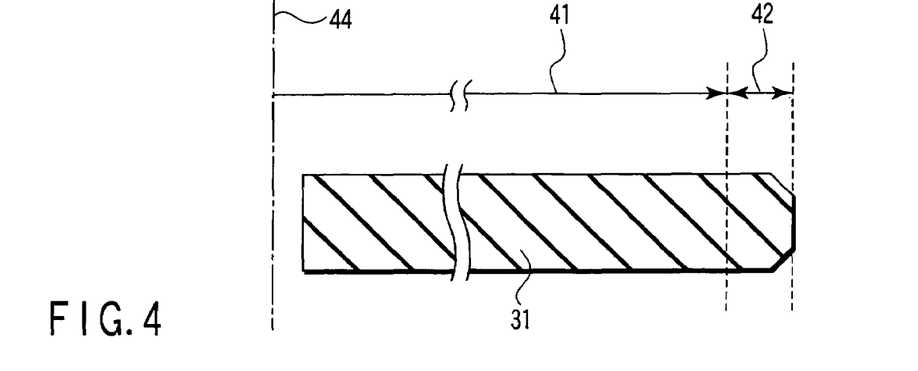
FIG. 4 is a schematic sectional view of a patterned magnetic recording media according to an embodiment of the present invention.

FIG. 4 shows a schematic sectional view of the patterned magnetic recording media according to an embodiment of the present invention. This drawing shows, with reference to the media 31, a central axis 44, an area 42 within 1 mm from the outer end of the media 31, and an radius 41 in which 1 mm is subtracted from a specification radius of the media.

The recessed portion 32 in FIG. 3 should be placed in the area within 1 mm from the outer end of the media, but an actual media has a tapered end as shown in FIG. 4. Therefore, in the present invention, the area 42 outside the radius 41, which is determined by subtracting 1 mm from the specification radius of the media, is defined as "the area within 1 mm from the outer end of the media". For example, when a specific radius is determined as 32.5 mm for a 2.5 inches type media, the area 41 is in a range within 31.5 mm from the central axis 44 in FIG. 4 and the area 42 outside the area 41 is "the area within 1 mm from the outer end of the media". It should be noted that the recessed portion 32 is preferably formed from the media end to at least an inner side from the tapered portion. For example, a specific value of the tapered portion is 150±70 μm in a case of a disk substrate having a diameter of 2.5 inches, so that the recessed portion 32 is preferably formed inside of the position at 150 μm from the outer media end. In a case of a substrate with the other diameter, the distance of the inside position of the recessed portion can be similarly decided on the basis of its specification.

Figure 5:
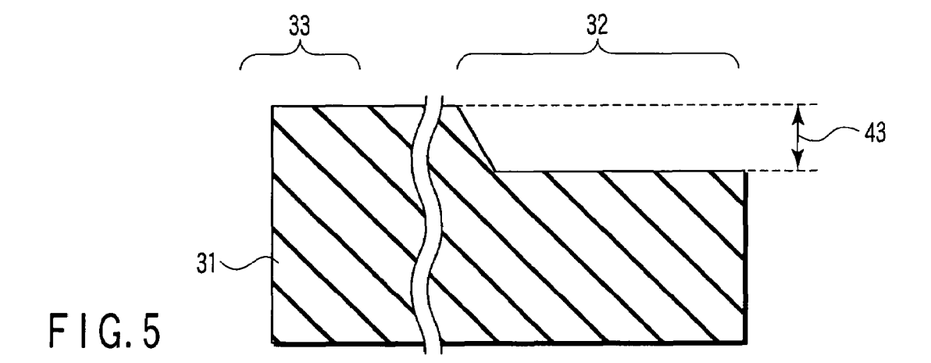
FIG. 5 is a schematic sectional view showing a recessed portion of a patterned magnetic recording media according to an embodiment of the present invention.

FIG. 5 shows a schematic sectional view of the recessed portion of a patterned magnetic recording media according to an embodiment of the present invention. As shown in this drawing, an area lower than a data area 33 extends to the outer media end. This area is the recessed portion 32 and enables to prevent a head crash by capturing dust when the magnetic head is loaded onto the media.

A height difference of the data area 33 and the recessed portion 32 is indicated by the numeral 43. A recessed amount indicated by 43 is preferably 1 nm to 50 nm. If the recessed amount is less than 1 nm, a head crash occurs by dust in portions other than the recessed portion 32. On the other hand, the recessed amount larger than 50 nm is not preferable because formation of the recessed portion will be costly, and the head crash might occur at this portion because of the difference in the flying height when the magnetic head is loaded on the recessed portion 32.

In FIG. 5, the recessed portion 32 is formed in parallel with the substrate surface. However, it should be noted that advantages of the present invention can be obtained even if the recessed portion 32 is inclined.

Figure 6:
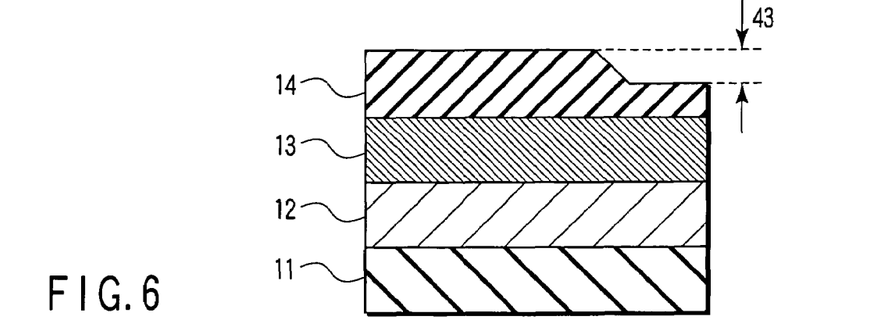
FIG. 6 is a sectional view of an example of a patterned magnetic recording media according to an embodiment of the present invention.

FIG. 6 shows a sectional view of an example of a patterned magnetic recording media according to an embodiment of the present invention. In this drawing, a recessed portion is formed by reducing the thickness of the protective layer 14. To manufacture such a media, processes before and after formation of the protective layer may include a process which inhibits the deposition of the protective layer or that etches the protective layer in an area within 1 mm from the outer end. If this method is used, it is not necessary to change preceding processes, where layers from the underlayer to a magnetic layer are deposited.

Figure 7:
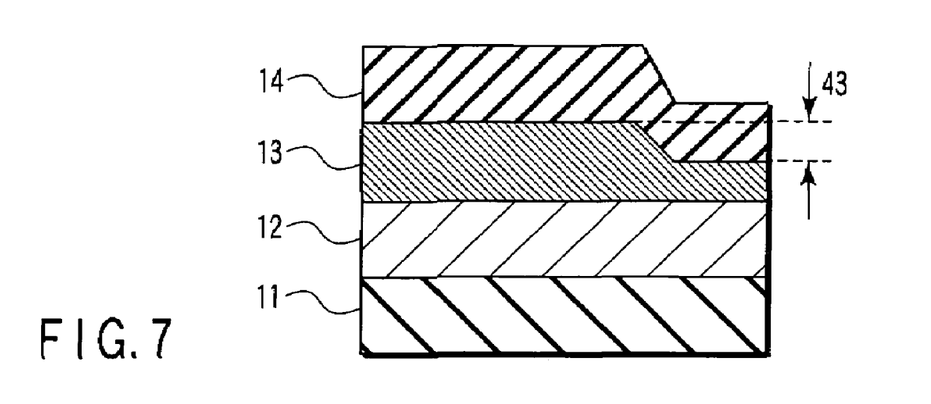
FIG. 7 is a sectional view of another example of a patterned magnetic recording media according to an embodiment of the present invention.

FIG. 7 shows a sectional view of another example of a patterned magnetic recording media according to an embodiment of the present invention. In this drawing, a thickness of the magnetic recording layer 13 of the recessed portion is made smaller than that of the data area. In general, the protective layer 14 should be as thin as possible, for example, set to a thickness of about 5 nm so that magnetic spacing may be as small as possible. Moreover, the protective layer 14 needs to have a property of low friction with the head and of allowing the lubricant to efficiently stick thereto. Thus, it is preferable in some cases to process the magnetic recording layer 13 under the protective layer 14 to form the recessed portion, rather than processing the protective layer 14 as shown in FIG. 6. To manufacture such a media, the processes before and after formation of the magnetic recording layer may include a process which inhibits the deposition of the magnetic recording layer 13 or that etches the magnetic recording layer 13 in the area within 1 mm from the outer end. If this method is used, it is not necessary to change the preceding deposition processes up to the underlayer.

Depending on a manufacturing process of the media and requirements of a system, it is properly selected whether to reduce the thickness of the protective layer as shown in FIG. 6, to reduce the thickness of the magnetic recording layer as shown in FIG. 7, or to reduce the thickness of both layers. In any case, the advantages of the present invention can be obtained.

Figure 8:
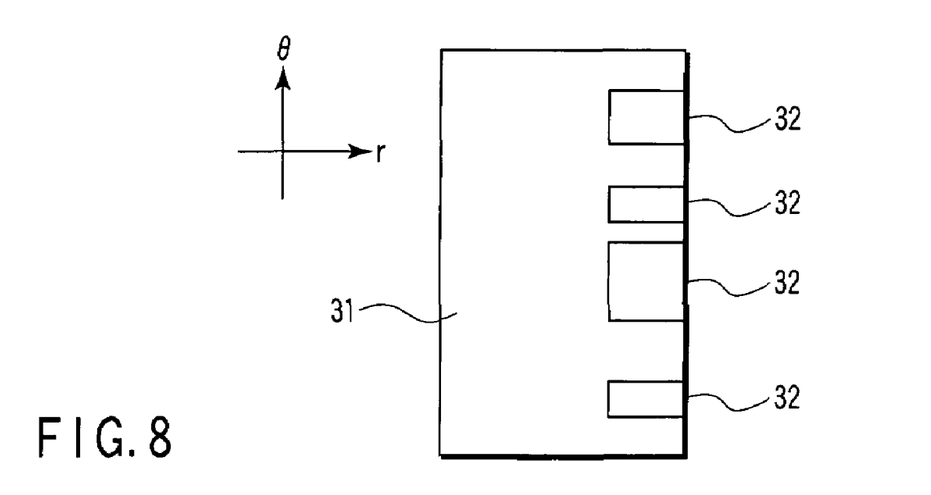
FIG. 8 is a plan view showing a part of an end of another patterned magnetic recording media according to an embodiment of the present invention.

FIG. 8 shows a part of an outer end portion of another patterned magnetic recording media according to an embodiment of the present invention. In this drawing, the horizontal direction is a radial direction (r direction) of the media, and the vertical direction is a circumferential direction (θ direction) of the media. As shown in this drawing, the recessed portions 32 may be formed as a plurality of recessed portions on the periphery of the media. That is, the recessed portion 32 does not need to be continuous along a periphery of the media. A distance between the recessed portions 32 is set to a range of 100 nm to 100 μm. If a distance between the recessed portions 32 is shorter than 100 nm, manufacturing costs increase. On the other hand, if the distance is greater than 100 µm, dust tends to be accumulated between the recessed portions and may cause the head crash.

An intermittent pattern of a plurality of recessed portions 32 as shown in FIG. 8, is effective to prevent a head crash on the outer periphery of the media due to a change in flying height caused by a height difference in the media surface.

Figure 9:
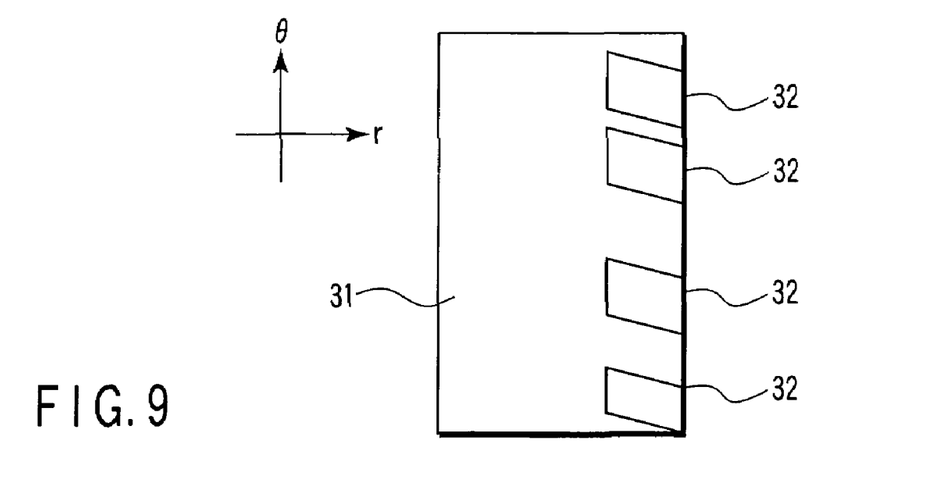
FIG. 9 is a plan view showing a part of an end of another patterned magnetic recording media according to an embodiment of the present invention.

Though the plurality of recessed portions 32 is drawn as a rectangular shape along the radial direction, it should be noted that arbitrary shape of the recessed portions 32 is possible. For example, as shown in FIG. 9, it may have a shape inclined with respect to the media radial direction.

Next, a stamper (imprinting master plate) used to manufacture a patterned magnetic recording media according to an embodiment of the present invention will be described. An imprinting method is used as one of the manufacturing methods of the patterned magnetic recording media. In this method, a resist is coated onto the media, and a master plate (stamper) having patterns to be processed is pressed (imprinted) on the resist to transfer the patterns into the resist layer. The patterned resist layer is used as a mask for an etching process such as ion milling or RIE. According to this method, even minute patterns of nanometer order can be transferred onto the media with high throughput, making it possible to reduce manufacturing costs of the media. The patterned magnetic recording media according to an embodiment of the present invention can also be manufactured at low cost using a similar imprinting method.

In the stamper according to the embodiment of the present invention, a pattern corresponding to the recessed portion of the media is formed in an area within 1 mm from a position of the stamper corresponding to the outer end of the media substrate. This pattern only needs to satisfy to form the recessed portion which is 1 to 50 nm deeper than the data area after the process. Such a requirement depends on a material of the mask and on an etching method. Therefore, it is not possible to decide an actual height of the pattern corresponding to the recessed portion.

Figure 10:
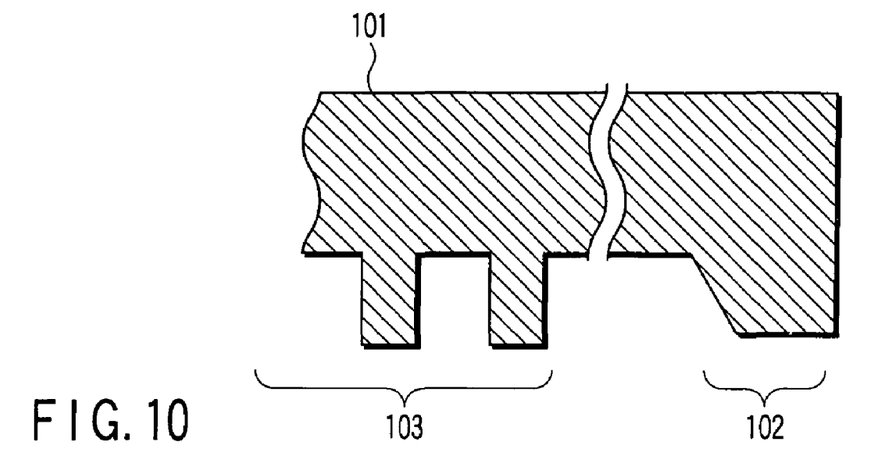
FIG. 10 is a schematic sectional view of an imprinting stamper according to an embodiment of the present invention.

FIG. 10 shows a schematic sectional view of an imprinting stamper 101 according to an embodiment of the present invention. In this drawing, the numeral 103 denotes a pattern corresponding to the pattern in the data area of the media. Depending on whether the stamper is negative or positive, a protruded portion corresponds to a recess or protrusion on the media. In this drawing, the numeral 102 denotes a pattern corresponding to the recessed portion of the media. Although the pattern 102 is indicated as a protrusion, it may be a recess depending on the type of the stamper, i.e., whether it is negative or positive.

Figure 11:
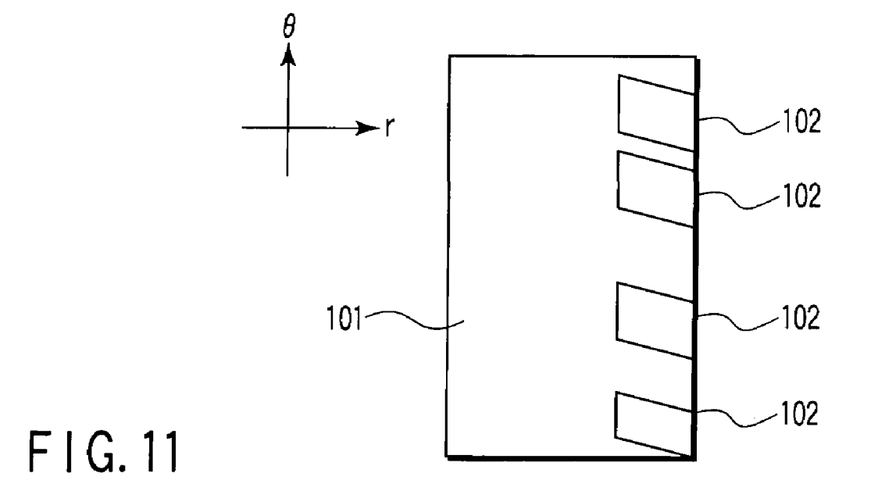
FIG. 11 is a plan view showing a part of an end of the imprinting stamper according to an embodiment of the present invention.

For the imprinting stamper according to the embodiment of the present invention used to manufacture a media having a plurality of recessed portions 32 as shown in FIG. 8 or FIG. 9, the patterns 102 corresponding to the recessed portions 32 of the media are formed in a plurality of divided patterns, as shown in a plan view of FIG. 11. A distance between the patterns 102 is set to a range of 100 nm to 100 µm. In FIG. 11, the horizontal direction is the radial direction (r direction) of the media, and the vertical direction is the circumferential direction (θ direction) of the media, as in FIG. 8 or 9. If the distance between the patterns 102 is smaller than 100 nm, manufacturing costs of the stamper increase. On the other hand, if the distance is greater than 100 µm, dust tends to accumulate between the recessed portions and may cause the head crash.

When a patterned magnetic recording media is manufactured by the imprinting stamper having the intermittent patterns 102 as shown in FIG. 11, it is possible to prevent a head crash in the outer periphery of the media due to a change in the flying height caused by a height difference in the media surface. It should be noted that the pattern corresponding to the recessed portion of the media may have a shape other than that shown in FIG. 11.

Next, a method of manufacturing a patterned magnetic recording media according to an embodiment of the present invention will be described.

Figure 12A:
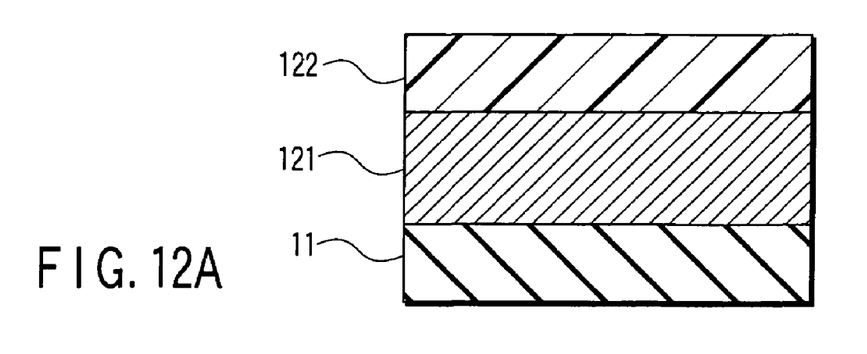
FIGS. 12A and 12B are sectional views showing an example of a method of manufacturing a patterned magnetic recording media according to an embodiment of the present invention.
Figure 12B:
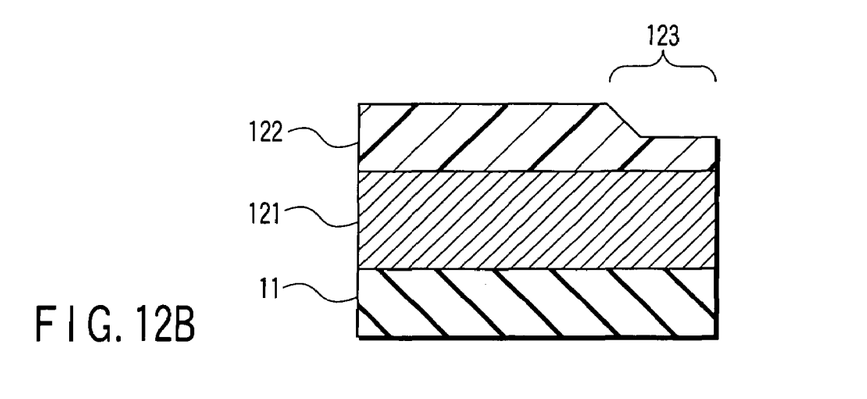

A part of the manufacturing process will be schematically described referring to FIGS. 12A and 12B. FIG. 12A shows a state where a magnetic recording layer 121 is deposited on the substrate 11 and an etching mask 122 is coated thereon. For the etching mask 122, an organic material such as a resist or an inorganic material such as spin-on glass (SOG) may be used. Next, as shown in FIG. 12B, a partially removed portion 123 of the etching mask 122 is formed in the area within 1 mm from the outer media end. As shown in FIG. 12B, it is not necessary to completely remove the etching mask 122 in the removed portion 123. The recessed portion can be formed in the magnetic recording layer 121 through this processed etching mask 122. Since the thin etching mask in the removed portion 123 is lost faster than thick one, the recessed portion is successfully formed on the media 121.

Methods of removing the etching mask include, for example, a method in which a solvent of the mask is coated to the portion corresponding to the recessed portion to reduce a thickness of the mask and/or a method in which the mask in the portion corresponding to the recessed portion is wiped with a cloth which does not produce dust or with a roller. The method in which the solvent is coated produces less dust and is easy, but is not good in controllability on a width of the recessed portion. On the other hand, the method in which the mask is wiped is likely to produce dust, but is good in controllability on the width of the recessed portion. For the method in which the mask is wiped, the cloth or roller is placed in an outer periphery of a spin coater, and then moved onto the substrate immediately after spin coating the mask material. This allows a high-speed mask removing process with good controllability. The mask may be removed in other methods. These methods can be applied to etching masks made of materials other than the material described above.

It is preferable to remove the etching mask at the recessed portion simultaneously with the formation of the mask for the data area because the data area and the recessed portion can be formed at a time. However, dust may reach the data area to cause loss of information (such as servo information).

When the etching mask 122 is coated onto the layer 121 where layers up to the magnetic recording layer are deposited, it is possible to manufacture a media in which the thickness of the magnetic recording layer is small in the recessed portion as shown in FIG. 7. When the etching mask 122 is coated onto the layer 121 where layers up to the magnetic recording layer and the protective layer are deposited, it is possible to manufacture a media in which the thickness of the protective layer is small in the recessed portion as shown in FIG. 6.

Figure 13A:
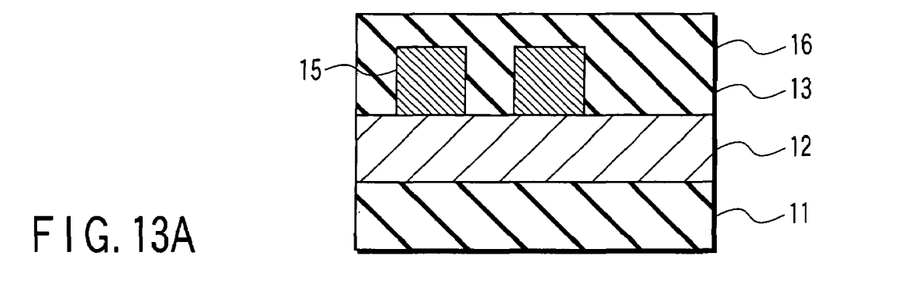
FIGS. 13A and 13B are sectional views showing another example of a method of manufacturing a patterned magnetic recording media according to an embodiment of the present invention.
Figure 13B:
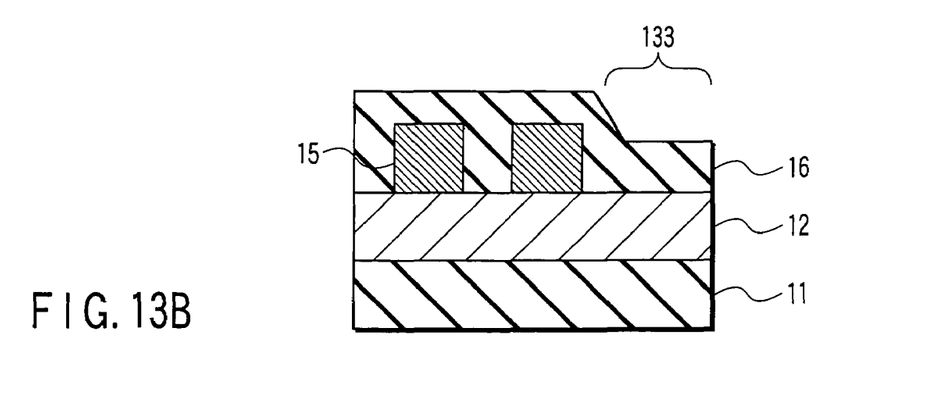

A part of another manufacturing process will be schematically described referring to FIGS. 13A and 13B. FIG. 13A shows a state in which the nonmagnetic material 16 to be filled in between the patterns of the magnetic material 15 is deposited after forming the patterns of the magnetic material 15 on the soft magnetic underlayer 12 on the substrate 11. Next, as shown in FIG. 13B, a partially removed portion 133 of the nonmagnetic material 16 is formed in the area within 1 mm from the outer media end.

Methods of forming the nonmagnetic material 16 include a method in which a nonmagnetic material such as $SiO_2$ is deposited by sputtering or the like. In this case, after forming the removed portion on the etching mask coated onto the nonmagnetic material, the removed portion 133 of the nonmagnetic material 16 may be formed by etching, as in the method shown in FIG. 12. The removed portion 133 of the nonmagnetic material 16 may be formed in such a manner that etching is performed under a condition in which only the periphery of the nonmagnetic material 16 is etched fast.

Another method of forming the nonmagnetic material 16 is to coat the SOG. In this case, to form the removed portion 133 of the nonmagnetic material 16, for example, a method in which a solvent of the SOG is coated to the portion corresponding to the recessed portion to reduce the thickness, and/or a method in which the SOG in the portion corresponding to the recessed portion is wiped with a cloth which does not produce dust or with a roller is possible. The method in which the solvent is coated produces less dust and is easy, but is not good in controllability on the width of the recessed portion. On the other hand, the method in which the SOG is wiped is likely to produce dust, but is good in controllability on the width of the recessed portion. In the method in which the SOG is wiped, the cloth or roller is placed in the outer periphery of the spin coater, and then the cloth or roller is moved onto the substrate immediately after spin coating the SOG. This allows a high-speed process with good controllability. The SOG may be removed in other methods.

As shown in FIG. 13B, it is not necessary to completely remove the nonmagnetic material 16 in the removed portion 133. The patterned media can be manufactured by depositing the protective layer directly in the following process as shown in FIG. 7.

Figure 14:
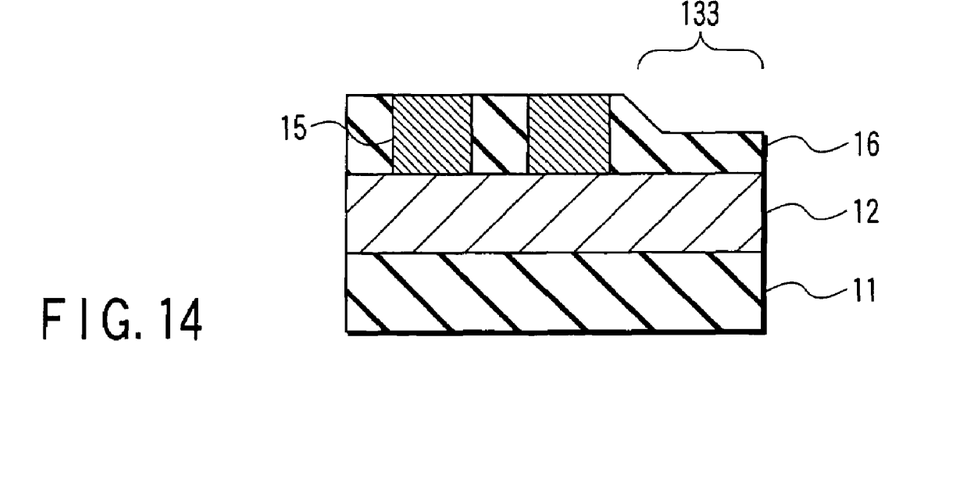
FIG. 14 is a sectional view showing still another example of a method of manufacturing a patterned magnetic recording media according to an embodiment of the present invention.

As shown in FIG. 14, the nonmagnetic material 16 may be etched down to just the magnetic material 15 appears. This method is advantageous for reducing the magnetic spacing loss, but will be costly.

Next, a magnetic recording/reproduction apparatus according to the embodiment of the present invention will be described. This magnetic recording/reproduction apparatus has a chassis, a spindle attached inside the chassis, a patterned magnetic recording media mounted on the spindle and having a recessed portion on the outer end portion thereof, a slider having a read/write head configured to fly above the patterned magnetic recording media, and a ramp mechanism which allows the read/write head to unload. A flying height of the slider is preferably 20 nm or less.

As described above, when the patterned magnetic recording media having the recessed portion is used in the magnetic recording/reproduction apparatus with a ramp load mechanism, dust is not captured during loading of the head. When the patterned magnetic recording media having the recessed portion is used in the magnetic recording/reproduction apparatus using a contact start stop (CSS) mechanism, dust is not captured when the head accesses around the periphery of the disk, but it is not so advantageous compared to the case of the apparatus with the ramp load mechanism.

As described below, a material and a stacked structure of the layers used for ordinary magnetic recording media can be applied to the patterned magnetic recording media according to the embodiment of the present invention.

<Substrate>

For the substrate, it is possible to use, for example, a glass substrate, an Al-based alloy substrate, a ceramic substrate, a carbon substrate or a Si substrate having an oxide surface, or such a substrate plated with NiP or the like.

The glass substrate includes amorphous glass and crystallized glass, and the amorphous glass that can be used includes soda lime glass and alumino-silicate glass. The crystallized glass that can be used includes lithium-based crystallized glass. For the ceramic substrate, it is possible to use, for example, aluminum oxide, aluminum nitride and silicon nitride as well as a compound including these materials as the main component or a fiber reinforced material of these substances.

It is also possible to use the metal or non-metal substrate in which a NiP layer is formed on a surface by use of a plating method or a sputtering method.

It should be noted that the sputtering method is only used below as a method of forming a thin film on the substrate, but a vacuum deposition method, an electroplating method or the like can also be used for the embodiment of the present invention.

<Soft Magnetic Underlayer>

When the magnetic recording layer 13 is a perpendicular magnetization film and the media is used as a perpendicular magnetic recording media, a soft magnetic underlayer (backing layer) with high permeability may be provided to construct a so-called perpendicular two-layer media. In this perpendicular two-layer media, the soft magnetic underlayer (SUL) performs as a part of the magnetic recording head such as a single-pole head by horizontally passing a recording magnetic field from the magnetic head through the recording media to return it to the magnetic head. The soft magnetic underlayer serves to apply a sharp magnetic field gradient with sufficient intensity to improve the read/write performance.

A material containing Fe, Ni and Co can be used for the soft magnetic underlayer. More specifically, it includes, for example, a FeCo-based alloy such as FeCo or FeCoV, a FeNi-based alloy such as FeNi, FeNiMo, FeNiCr or FeNiSi, a FeAl-based alloy, a FeSi-based alloy such as FeAl, FeAlSi, FeAlSiCr, FeAlSiTiRu or FeAlO, a FeTa-based alloy such as FeTa, FeTaC or FeTaN, or a FeZr-based alloy such as FeZrN.

It is also possible to use a material having a microcrystalline structure such as FeAlO, FeMgO, FeTaN or FeZrN containing 60 at % or more of Fe, or having a granular structure in which fine crystal grains are dispersed in a non-magnetic matrix.

As another material for the soft magnetic underlayer, a Co alloy can be used which contains Co and at least one selected from the group consisting of Zr, Hf, Nb, Ta, Ti and Y. Co is preferably contained at 80 at % or more. Such a Co alloy generally becomes amorphous when formed into a film by the sputtering method. The amorphous soft magnetic material does not have a crystalline magnetic anisotropy, crystal defects and a grain boundary, and therefore shows good soft magnetic characteristics. The use of such an amorphous soft magnetic material can reduce noise in the media.

A preferred amorphous soft magnetic material includes, for example, CoZr, CoZrNb, and a CoZrta-based alloy.

Under the SUL, it is possible to further provide an underlayer to improve crystallinity of the SUL and/or to improve an adhesion to the substrate. As a material for the underlayer, it is possible to use Ti, Ta, W, Cr, Pt or an alloy containing the above, or an oxide or nitride of the above.

An intermediate layer made of a nonmagnetic material can be provided between the SUL and the recording layer. The intermediate layer has two functions; blocking the exchange coupling interaction between the SUL and the recording layer and controlling the crystallinity of the recording layer. As a material for the intermediate layer, it is possible to use Ru, Pt, Pd, W, Ti, Ta, Cr, Si or an alloy containing the above, or an oxide or nitride of the above.

In order to prevent the spike noise, the SUL layer may be divided into a plurality of layers. A Ru layer with a thickness of 0.5 to 1.5 nm may be inserted to exert antiferromagnetic exchange coupling between the layers. A soft magnetic layer may be exchange-coupled to a hard magnetic layer such as CoCrPt, SmCo or FePt having in-plane anisotropy or to a pinning layer made of an antiferromagnetic material such as IrMn or PtMn. In this case, a magnetic film (e.g., Co) or a nonmagnetic material (e.g., Pt) may be stacked under or on the SUL layer to control exchange-coupling strength.

<Magnetic Recording Layer>

For the magnetic recording layer, it is possible to use any one of a perpendicular magnetization film, in which the magnetization easy axis is mainly oriented perpendicular to the media, or an in-plane magnetizing film, in which the magnetization easy axis is mainly oriented in the in-plane direction of the media. The magnetic recording layer is preferably made of a material containing Co as the main component, containing at least Pt, and containing an oxide. The oxide is preferably cobalt oxide, silicon oxide, titanium oxide or an oxide of a metal constituting the magnetic recording layer.

In the magnetic recording layer, magnetic grains (magnetic crystal grains) are preferably dispersed. These magnetic grains preferably have a columnar structure through the magnetic recording layer. This structure results in the good orientation and crystallinity of the magnetic grains, and it is therefore possible to obtain a signal-to-noise ratio (SNR) suitable for high-density recording.

An amount of the oxide is important to obtain such a structure. The oxide content is preferably 3 mol % or more and 12 mol % or less in a total amount of Co, Cr and Pt. Still preferably, it is 5 mol % or more and 10 mol % or less. The reason is that the oxide can precipitate around the magnetic grains to give good isolation and miniaturization of the magnetic grains.

When the oxide content is over the above-mentioned range, the oxide remains in the magnetic grains and degrade the orientation and crystallinity of the magnetic grains. The oxide may precipitate on and under the magnetic grains and may prevent the formation of the columnar structure. It is not preferable that the oxide content is below the above-mentioned range because the isolation and miniaturization of the magnetic grains is not sufficient, which results in increasing medium noise and is not suitable for high-density recording.

The Cr content of the magnetic recording layer is preferably 0 at % or more and 16 at % or less. Still preferably, it is 10 at % or more and 14 at % or less. The Cr content is preferably within the above-mentioned range because a crystalline magnetic anisotropy constant Ku of the magnetic grains is kept high without losing so much magnetization, thus making it possible to obtain read/write characteristics suitable for high-density recording and sufficient thermal fluctuation characteristics.

It is not preferable that the Cr content is over the above-mentioned range because Ku of the magnetic grains is reduced. This leads to deterioration of the thermal fluctuation durability, crystallinity and orientation of the magnetic grains and results in deteriorated read/write characteristics.

The Pt content of the magnetic recording layer is preferably 10 at % or more and 25 at % or less. The Pt content is preferably within the above-mentioned range because sufficient Ku for high-density recording and good crystallinity and orientation of the magnetic grains can be obtained, thus making it possible to obtain the thermal fluctuation durability and the read/write characteristics suitable for high-density recording.

It is not preferable that the Pt content is over the above-mentioned range because an fcc structure is formed in the magnetic grains and the crystallinity and orientation might be impaired. It is not preferable that the Pt content is below the above-mentioned range because it is not possible to obtain sufficient Ku to obtain the thermal fluctuation characteristics for high-density recording.

In addition to Co, Cr, Pt and the oxide, the magnetic recording layer can contain at least one element selected from the group consisting of B, Ta, Mo, Cu, Nd, W, Nb, Sm, Tb, Ru and Re. When the above-mentioned element is contained, the miniaturization of the magnetic grains can be promoted or the crystallinity and orientation can be improved. Thus, it is possible to obtain the read/write characteristics and the thermal fluctuation durability more suitable for high-density recording.

The total content of the above-mentioned element is preferably 8 at % or less. It is not preferable that the total content thereof is over 8 at % because a crystalline phase other than the hcp is formed in the magnetic grains and the crystallinity and orientation of the magnetic grains are degraded. This results in the read/write characteristics and the thermal fluctuation durability not suitable for high-density recording.

For the magnetic recording layer, it is possible to use a CoPt-based alloy, a CoCr-based alloy, a CoPtCr-based alloy, CoPtO, CoPtCrO, CoPtSi and CoPtCrSi. A multilayer structure of Co and an alloy including as the main component at least one selected from the group consisting of Pt, Pd, Rh and Ru including CoCr/PtCr, CoB/PdB, CoO/RhO can be used. Cr, B and O can be added to the above multilayer system.

The thickness of the magnetic recording layer is preferably 2 to 60 nm, and still preferably 5 to 30 nm. A thickness of the magnetic recording layer below 2 nm tends to result in a too small signal output and large noise. A thickness of the magnetic recording layer over 60 nm tends to result in a too high read signal and a distorted waveform.

Coercive force of the magnetic recording layer is preferably 237000 A/m (30000 Oe) or more. If the coercive force is below 237000 A/m (30000 Oe), thermal fluctuation durability tend to deteriorate.

<Protective Layer>

The protective layer is provided on the magnetic recording layer. The protective layer is provided in order to prevent corrosion of the magnetic recording layer and to prevent damage to the media surface when the magnetic head is brought into contact with the media. Materials thereof include, for example, C, $SiO_2$ or $ZrO_2$.

The thickness of the protective layer is preferably 1 to 10 nm. The thickness of the protective layer is preferably at this level because spacing between the head and the media can be reduced.

<Lubricant Layer>

The lubricant layer can be provided on the protective layer. It is possible to use conventionally known materials such as perfluoropolyether, alcohol fluoride and fluorinated carboxylic acid.

Key feature of the patterned magnetic recording media according to an embodiment of the present invention is a structure of the magnetic recording layer. As shown in FIG. 1, the magnetic recording layer 13 includes the magnetic material 15, and the nonmagnetic material 16 filled in between the patterns of the magnetic material 15. Such a magnetic material separated by the nonmagnetic material can produce signals in, for example, the servo zone depending on whether or not the magnetic material exists. As shown in FIG. 2, the servo zone 22 of the patterned magnetic recording media according to an embodiment of the present invention includes a preamble section, an ABCD burst section, an address section and a mirror section. These servo signals are also generated by the magnetic material 15 and the nonmagnetic material 16 and are read by the read head.

In a patterned magnetic recording media according to an embodiment of the present invention, an isolated pattern of the magnetic material for each recording unit may be formed in the user area 23 shown in FIG. 2. In such a patterned magnetic recording media, one magnetic pattern will be one recording mark (number of bits per one unit varies by the system). Such a patterned magnetic recording media has an advantage of high tolerance against the thermal fluctuation because the insolated magnetic grains can be increased in size as compared with a conventional media in which several ten to several hundred insolated magnetic crystal grains form one recording mark. However, an accurate positioning of the head onto the recording mark is necessary.

An example of a method of manufacturing a patterned magnetic recording media will be described below.

<Manufacture of Stamper>

First, a master plate for the pattern is manufactured. A photosensitive resin is coated onto a Si substrate, and an electron beam is irradiated to the photosensitive resin layer to form a latent image, and then this latent image is developed to form patterns of protrusions and recesses. The patterns of protrusions and recesses are generated by use of an exposure apparatus comprising a signal source to control the electron beam with predetermined timing and a stage, which highly accurately moves the substrate synchronously with the signal source.

An Ni conductive layer is formed on the resultant resist master plate by the ordinary sputtering method. Next, a nickel film is electroformed on the conductive layer with a thickness of about 300 μm. For electroforming, a high-concentration nickel sulfamate plating solution (NS-160) manufactured by Showa Chemical Corporation. One example of electroforming conditions is as follows.

Nickel sulfamate: 600 g/L
Boric acid: 40 g/L
Surfactant (sodium lauryl sulfate): 0.15 g/L
Temperature of a solution: 55° C.
pH: 3.8 to 4.0
Current density: 20 A/dm$^2$.

Subsequently, the electroformed film is released from the resist master plate to obtain a stamper comprising the conductive film, the electroformed film and a residual resist. Then, the resist residual is removed by oxygen plasma ashing process. An example of the oxygen plasma ashing condition is as follows; flow rate of an oxygen gas: 100 ml/min, ashing time: ten minutes, power: 100 W and pressure: 4 Pa. This becomes a father stamper.

The father stamper itself can be used as the imprinting stamper, but it is preferable to subject this father stamper to the electroforming process repeatedly to duplicate a large number of stampers as follows. First, an oxide film is formed on a surface of the father stamper in the oxygen plasma ashing similar to that for removing the resist residual. An example of the condition is; flow rate of the oxygen gas: 100 ml/min, time: three minutes, power: 200 W and pressure: 4 Pa. Then, a nickel film is electroformed with the same technique as the above. Subsequently, the electroformed film is released from the father stamper. This is a mother stamper, in which the negative pattern is formed. The step of obtaining the mother stamper from the father stamper is repeated to obtain ten or more mother stampers.

Further, in the same manner as a procedure of obtaining the mother stamper from the father stamper, an oxide film is formed on a surface of the mother stamper, and an Ni film is electroformed and released, thereby obtaining a son stamper having the same patterns of the father stamper.

<Imprinting>

After the (son) stamper is ultrasonically cleaned with acetone for five minutes, it is immersed in fluoroalkylsilane [Cf$_3$(Cf$_2$)$_7$Cf$_2$CH$_2$Si(OMe)$_3$] (a brand name TSL8233 manufactured by GE Toshiba Silicone corporation) which is a silane coupling agent containing a chlorine-based fluorine resin as a fluorine-based release agent in ethanol with a concentration of 2% for 30 minutes or more. The solution is blown off by a blower, and then it is annealed for one hour at 120° C. in a nitrogen atmosphere. A resist (prepared in such a manner that a brand name S1818 manufactured by Rohm and Haas Electronic Materials corporation is diluted five times with polyethyleneglycol monomethylether acetate (PG-MEA), or S1801) is coated to the magnetic disk by the spin coater, and the stamper with patterns of protrusions and recesses is pressed for 60 seconds at 450 bar. Then, the stamper is released by use of vacuum tweezers. The patterns are transferred to a resist film, and the patterns are hardened by UV irradiation for five minutes and then annealed at 160° C. for 30 minutes to crosslink the entire resist film.

<Media Etching>

RIE using the oxygen gas is used to remove the resist residual in the recessed portion of the imprinted pattern on the medium. Subsequently, the magnetic recording layer is etched by Ar ion milling. The angles of the incident ions are selected to be 30° and 70° in order to suppress a damage to the magnetic layer and a re-deposition phenomenon, respectively. After etching the magnetic material, oxygen RIE is used to remove the etching mask. Then, carbon is deposited as a protective layer. A lubricant is coated on the media by a dipping process.

In this case, a magnetic material is such as CoCrPt and the nonmagnetic material is a mixture of air, the carbon protective film and the lubricant.

It is also possible to manufacture a patterned magnetic recording media whose surface is substantially flat. A method of manufacturing such a magnetic disk will be shown below.

The process of manufacturing the stamper is the same as that in the method described above. In an imprinting process, the spin-on glass (SOG) is coated on the media by a spin coater. The SOG can be classified into silica glass, an alkylsiloxane polymer, an alkylsilsesqioxan polymer (MSQ), a hydrogenated silsesqioxan polymer (HSQ), a hydrogenated alkysiloxane polymer (HOSP) and the like depending on a chemical structure of siloxane. For example, T-7 manufactured by Tokyo Ohka Corporation and FOX manufactured by Dow Corning corporation are diluted by five times with methyl isobutyl ketone (MIBK). After coating of the SOG, it is pre-baked for 20 minutes at 100° C. in an oven in order to evaporate the solution of the SOG and to obtain proper hardness. Then, the stamper is pressed for 60 seconds at 450 bar to transfer the patterns to the SOG resist.

Next, an inductively coupled plasma (ICP) etching apparatus is used to remove residuals of the SOG film. SF$_6$ is used as an etching gas, and a chamber pressure is set to 2 mTorr. Both coil RF power and platen RF power are set to 100 W. Etching time is set to, for example, 2 minutes and 40 seconds. A milling process is similar to that mentioned above.

After the milling process, SOG similar to that used for the etching resist is embedded by the spin coater. Then, the media is ion milled again until a magnetic layer appears (etch-back process). In this case, the nonmagnetic material is SiO$_2$. It is also possible to use Al$_2$O$_3$, Ta$_2$O$_5$ or the like for the filling material by using the ordinary sputtering method for depositing and ion milling for etch-back. Any material which can be deposited by sputtering is used as the nonmagnetic filling material.

It should be noted that a patterned media whose surface is uneven may be manufactured by controlling the amount of the etch-back. A patterned media may be fabricated by forming the ordinary magnetic recording media on the patterned substrate made by the similar process mentioned above. A patterned media whose surface is substantially flat may be fabricated on the patterned substrate by filling and etch-backing the nonmagnetic material as mentioned above.

EXAMPLES

Example 1

In the present example, a glass substrate having a diameter of 0.85 inches was used as a disk substrate 11. A thin film was deposited on the glass substrate by use of a DC magnetron sputter method, and a perpendicular magnetic recording media schematically shown in FIG. 1 was manufactured. A CoZrNb soft magnetic underlayer (SUL) [100 nm]/a Ta intermediate layer [5 nm]/a Ru seed layer [10 nm] was used as an underlayer. CoCrPt—$SiO_2$ [20 nm] was used as a magnetic recording layer, and C [4 nm] manufactured by a CVD method was used for a protective layer. After the deposition of the SUL, the media was etched by an Ar ion milling through a Ta mask plate having the same size as the disk substrate placed above the substrate. Since Ar ions tend to go under the mask around the mask edge, the outer end of the media was slightly etched. The position of the Ta mask and conditions of the Ar ion milling (pressure, energy) were adjusted so that an area 1 mm from the outer end of the disk substrate was only etched. The etching time was adjusted to manufacture media whose recessed amounts are 0.5, 1, 5, 10, 20, 50, 70 and 100 nm, respectively.

These media were evaluated by a read/write tester (spin stand). In this evaluation, a recording head was loaded by a similar manner to that in an actual drive in order to check if the head crash occurs. A head was loaded from the outside of the media and a state of the contact between the media and the head were evaluated by an acoustic emission (AE) sensor or a vibration sensor. When the contact noise was detected by the AE sensor or when vibration of a slider was observed by the vibration sensor, the media was classified as defective. An incidence of the defect was evaluated for ten runs. As a result, defects were not produced in the media whose recessed amount was 1 to 50 nm.

Figure 15:
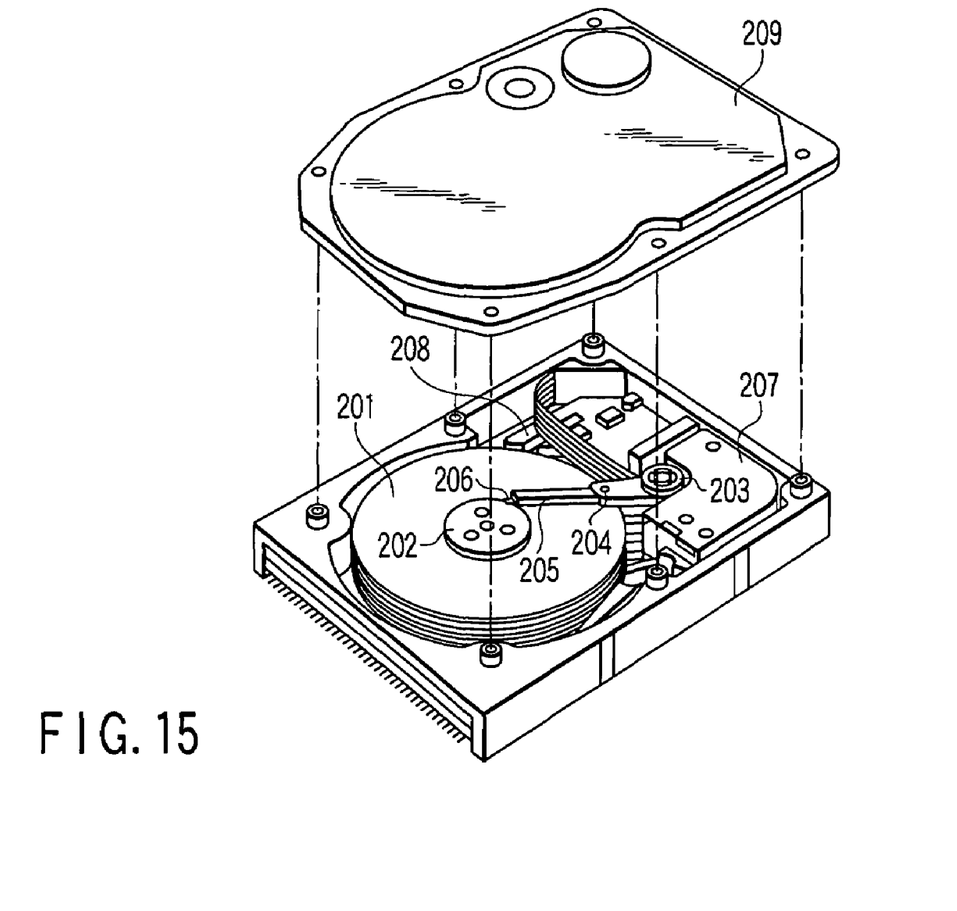
FIG. 15 is a perspective view of a magnetic recording/reproduction apparatus according to an embodiment of the present invention.

Next, the media described above was used to manufacture a magnetic recording/reproduction apparatus. FIG. 15 shows a perspective view of the magnetic recording/reproduction apparatus. A spindle 202 is attached inside a chassis, and a patterned magnetic recording media 201 provided with a recessed portion is rotatably mounted on the spindle 202. An actuator arm 204 is attached to a pivot 203 located in the vicinity of the media 201. A suspension 205 is attached to a tip of the actuator arm 204. A slider 206 is supported on a lower surface of the suspension 205. A read/write head is formed at a tip of the slider 206. The magnetic head is a so-called integrated head, and includes a write head having a single-pole structure, and a read head using a GMR film, a TMR film or the like. The actuator arm 204 is operated by a voice coil motor (VCM) 208. The slider 206 is unloaded to the ramp mechanism 208 before the operation. When the media 201 is rotated by the spindle 202, the head is loaded on the media 201 and is positioned in a flying state. The numeral 209 denotes a cover. Digital data are magnetically recorded on the media 201 as a perpendicular recording system. A circuit board of this device comprises a head IC, which generates drive signals for an actuator and a control signal for read/write head.

Tracking performance of the apparatus described above was tested by repeating the load and unload operation for 100 times. As a result, some apparatuses equipped with media other than media whose recessed amount was 1 to 50 nm showed tracking error, and in the worst case, some of the apparatuses stopped by the head crash.

Example 2

A media was manufactured as follows. In patterns of an imprinting stamper, a recessed portion was formed in a portion corresponding to an area within 1 mm from the outer media end. The recessed portion was continuous as schematically shown in FIG. 3. The data area was patterned as isolated marks of the recording unit (a discrete bit type patterned magnetic recording media). A substrate size was changed to 1.8 inches type. A manufacturing process was changed as follows.

Film stack of a FeCoTa soft magnetic underlayer (SUL) [80 nm]/a Ta intermediate layer [5 nm]/an Ru seed layer [10 nm]/CoCrPt—$Tio_x$ [15 nm]/C [2 nm] was deposited on a substrate. Then, SOG was coated to the media. Imprinting was carried out using the stamper described above. The resist residual at the recessed portion of the imprinted pattern was removed using $SF_6$ gas. The surface of the media was flattened by filling SOG and etching back it by Ar ion milling. Subsequently, a carbon protective layer [2 nm] was deposited. In this case, a pattern height of the recessed portion of the stamper was changed to change depths 43 of the outer recessed portion of the media after the process to 0, 1, 10, 50 and 80 nm, respectively. When sectional structures of processed media were checked by TEM, the carbon protective layer of the outer recessed portion was at least 1 nm thinner than the carbon protective layer of a data area except in the media having a recessed depth of 0 nm. These media were subject to a spin stand test similar to that in Example 1. As a result, the media whose recessed amount was 1 to 50 nm were not defective.

These media were used to manufacture recording/reproduction apparatuses similar to those in Example 1, and a test similar to that in Example 1 was conducted. As a result, some apparatuses equipped with media other than media whose recessed amount was 1, 10 and 50 nm showed tracking error, and in the worst case, some of the apparatuses stopped by the head crash.

Next, a stamper as schematically shown in FIG. 8, in which a plurality of patterns corresponding to the recessed portion was separately formed, was used. A distance between the recessed portions was set to 50 nm, 100 nm, 200 nm, 1 µm, 100 µm and 500 µm, respectively. The recessed amount was set to 5 nm. These media were subject to a spin stand test similar to that in Example 1. As a result, the media with a distance between the recessed portions of 100 nm, 200 nm, 1 µm, 10 µm and 100 µm were not defective.

These media were used to manufacture recording/reproduction apparatuses similar to those in Example 1, and a test similar to that in Example 1 was conducted. As a result, some apparatuses equipped with media other than media with a distance between the recessed portions of 100 nm, 200 nm, 1

μm, 10 μm and 100 μm showed tracking error, and in the worst case, some of the apparatuses stopped by the head crash.

Example 3

A media was manufactured as follows. A substrate size was changed to 2.5 inches. A manufacturing process was changed as follows.

A film stack of a NiTa underlayer [15 nm]/a Cr underlayer [5 nm]/a CoCrPtB [25 nm] was deposited on a substrate. This magnetic recording layer is a so-called in-plane recording layer whose easy axis of magnetization is in the plane of the media. A photo-resist was coated and then imprinted using a stamper similar to that in Example 1. Then, an area within 1 mm from the outer media end was wiped with a cloth made from dustless fabric in order to reduce the resist thickness. Next, the resist residual in the recessed portion of the imprinted pattern was removed using $O_2$ gas, and then the media was etched by Ar ion milling, and then the residual resist was ashed by $O_2$ ashing. Then, $SiO_2$ was filled by bias sputtering and etched back by Ar ion milling. Then, a carbon protective layer [4 nm] was deposited. In accordance with this process, a media in which the recessed portion exists in the magnetic recording layer as schematically shown in FIG. 7 could be manufactured. In this case, various pressures of pressing the cloth and rotation speeds were used. In addition, instead of wiping with the cloth, a slight amount of a solvent of the resist was dropped after the resist spin-coating process in the area within 1 mm from the outer media end without stopping the rotation. Various amount of the drop was tried. The thickness of the resist layer at the outer end was reduced by this process. When sectional structures of the media after these processes were checked by TEM, depths 43 of the outer recessed portion of the magnetic recording layer were 0, 0.8, 1, 15 and 25 nm, respectively. These media were subject to a spin stand test similar to that in Example 1. As a result, the media whose recessed amount was 1 to 25 nm were not defective.

These media were used to manufacture recording/reproduction apparatuses similar to those in Example 1, and a test similar to that in Example 1 was conducted. As a result, some apparatuses equipped with media other than media whose recessed amount was 1 to 25 nm showed tracking error, and in the worst case, some of the apparatuses stopped by the head crash.

Next, a film stack of a NiTa underlayer [15 nm]/a Cr underlayer [5 nm]/a CoCrPtB [25 nm]/C [3 nm] was deposited on a substrate. Then, SOG was coated and imprinted using the stamper similar to that used in Example 1. Then, the resist residual of the recessed portion of the imprinted pattern was removed using $SF_6$ gas, and then the media was etched by an Ar ion milling. Subsequently, the SOG was again coated for filling. Then, an area within 1 mm from the media end was wiped with a cloth made from dustless fabric in order to reduce the thickness of the SOG. Next, the SOG was etched back by Ar ion milling, and then a carbon protective layer [2 nm] was deposited. In accordance with this process, a media in which the recessed portion was in the protective layer as schematically shown in FIG. 6 was manufactured. In this case, various pressures of pressing the cloth and rotation numbers were tried. Instead of wiping with the cloth, a slight amount of a solvent of the SOG was dropped in the area within 1 mm from the outer media end. Various amount of the drop was tried. When sectional structures of the media after these processes were checked by TEM, the depths 43 of the outer recessed portion of the protective layer processed were 0, 0.5, 1, 3 and 4 nm, respectively. These media were subject to a spin stand test similar to that in Example 1. As a result, the media whose recessed amount was 1 to 4 nm were not defective.

These media were used to manufacture recording/reproduction apparatuses similar to those in Example 1, and a test similar to that in Example 1 was conducted. As a result, some apparatuses equipped with media other than media whose recessed amount was 1 to 4 nm showed tracking error, and in the worst case, some of the apparatuses stopped by the head crash.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A patterned magnetic recording media, comprising:
   a magnetic recording layer and a protective layer formed on a substrate, in which the magnetic recording layer includes a magnetic material patterned in tracks and a nonmagnetic material filled in between the tracks in a data area; and
   a recessed portion formed in an area within 1 mm from an outer media end and extending to the media end, and the recessed portion is 1 to 50 nm deeper than the data area, wherein a thickness of the protective layer in the recessed portion is at least 1 nm smaller than a thickness of the protective layer in the data area.

2. A patterned magnetic recording media, comprising:
   a magnetic recording layer and a protective layer formed on a substrate, in which the magnetic recording layer includes a magnetic material patterned in tracks and a nonmagnetic material filled in between the tracks in a data area; and
   a recessed portion formed in an area within 1 mm from an outer media end and extending to the media end, and the recessed portion is 1 to 50 nm deeper than the data area, wherein a thickness of a magnetic layer in the recessed portion is at least 1 nm smaller than a thickness of the magnetic layer in the data area.

3. The media according to claim 1, wherein the recessed portion is divided into a plurality of recessed portions, and a distance between the recessed portions is set to a range of 100 nm to 100 μm.

4. A magnetic recording/reproducing apparatus comprising:
   a chassis;
   a spindle attached inside the chassis;
   a patterned magnetic recording media according to claim 1 rotatably mounted on the spindle;
   a slider having a read/write head configured to fly above the patterned magnetic recording media; and
   a ramp mechanism which allows the read/write head to unload.

5. The apparatus according to claim 4, wherein a flying height of the slider is 20 nm or less.

6. The media according to claim 2, wherein the recessed portion is divided into a plurality of recessed portions, and a distance between the recessed portions is set to a range of 100 nm to 100 μm.

* * * * *